Feb. 2, 1960

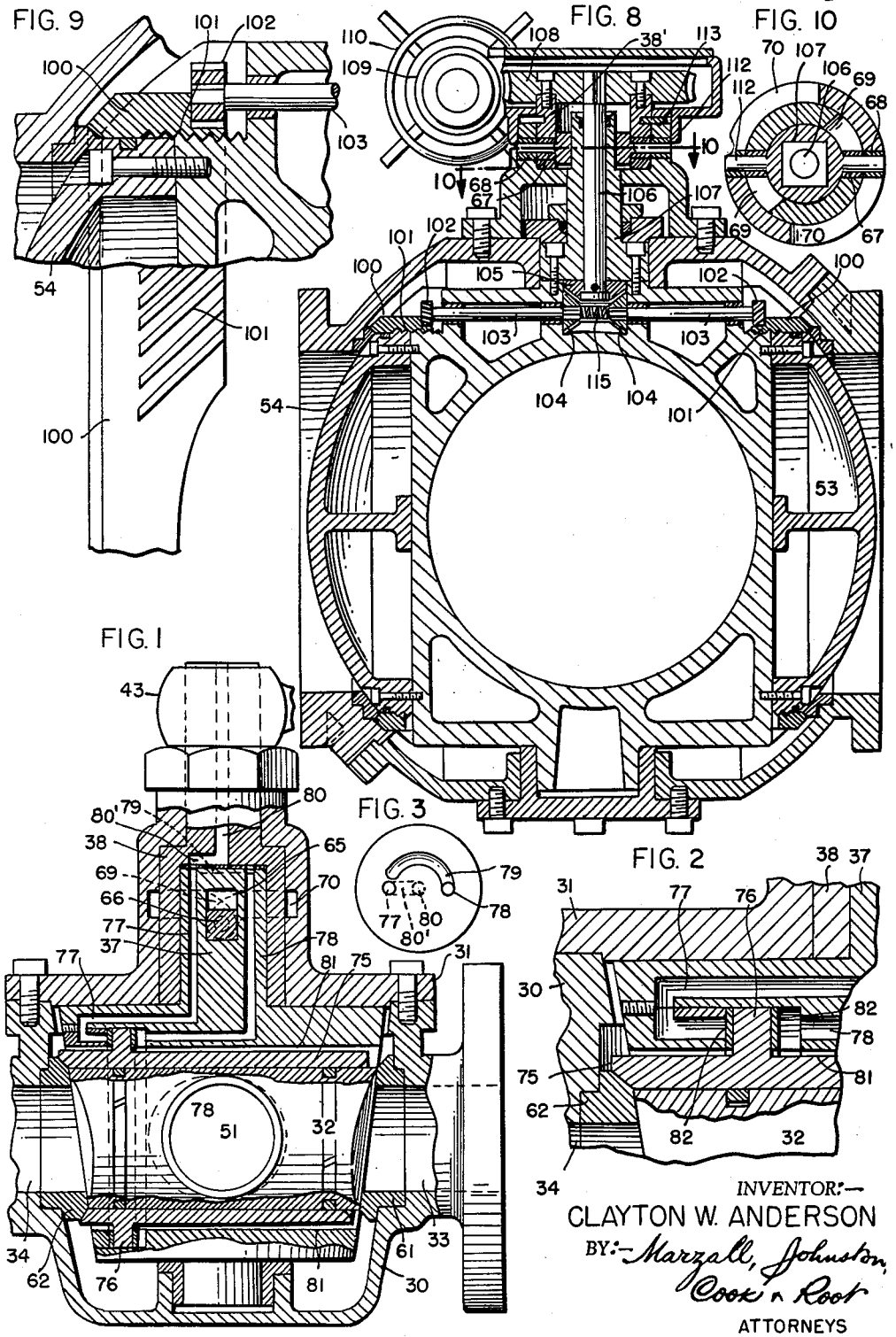

C. W. ANDERSON 2,923,320

VALVE STRUCTURE

Original Filed April 20, 1953

INVENTOR:—
CLAYTON W. ANDERSON
BY:—
Marzall, Johnston, Cook n Root

ATTORNEYS

United States Patent Office 2,923,320
Patented Feb. 2, 1960

2,923,320

VALVE STRUCTURE

Clayton W. Anderson, Marion, Ind.

Original application April 20, 1953, Serial No. 349,759, now Patent No. 2,879,798, dated March 31, 1959. Divided and this application July 7, 1958, Serial No. 751,816

8 Claims. (Cl. 137—628)

My invention relates to rotary valves for controlling the flow of fluids, and especially of liquids, by rotation between closed and open positions, the present application covering subject matter divided from my copending application for U.S. Letters Patent, Serial No. 349,759, filed April 20, 1953, which issued as U.S. Patent No. 2,879,798, on the 31st day of March, 1959.

It is the object of my invention to provide a rotary valve which has a minimum of flow restriction, is balanced in design for handling differential pressures, requires few parts and thus promotes economy in production, is easy to operate and certain in its operation, provides effective positive valve closure and does so without raising unduly the strain on the valve-casing, and has that positive closure enhanced by the fluid pressure of the line.

In general, my improved valve has a valve-casing having an inlet port and an outlet port, usually diametrically opposite each other; a turntable valve-plug having an open position in which it provides a fluid passage between the inlet and outlet ports and a closed position in which it closes that fluid passage; a sealing sleeve, desirably carried by that valve-plug, and movable with respect to both the valve-plug and the valve-casing when the valve-plug is in closed position to and from a sealing seat surrounding at least one of the ports, preferably the outlet port, said sealing sleeve preferably having such surfaces exposed to the pressure within the valve-casing that that pressure tends to seat said sealing sleeve when the valve is closed; and operating mechanism for said valve-plug for successively unseating the sealing sleeve and turning the valve-plug in opening the valve and for successively turning the valve-plug and seating the sealing sleeve in closing the valve.

In its simplest form, my valve is wholly manually operated. This is the preferred form for low-pressure valves especially of the smaller sizes. In this form the power for turning the valve-plug and for the initial seating and the unseating of the sealing sleeve is furnished by hand, although, preferably, fluid pressure within the valve-casing enhances and maintains the seating.

In high-pressure valves and larger valves, however, the seating and unseating of the sealing sleeve is preferably done by fluid pressure; and the operation of the valve-plug may also be by power, as by fluid pressure.

The accompanying drawings illustrate my invention. In those drawings:

Fig. 1 is a longitudinal section through a valve embodying my invention, with a tapered valve-plug in closed position, and with a single hydraulically actuated sealing sleeve in sealing position;

Fig. 2 is a fragmental view showing on an enlarged scale a portion of one end of the sealing sleeve of the valve of Fig. 1, and adjacent parts, including the auxiliary valves operated by the sealing sleeve movement;

Fig. 3 is a plan of the upper end of the valve-stem of the valves of Figs. 1 and 5;

Fig. 8 is a longitudinal section through still another valve embodying my invention, also with a spherical valve-plug in closed position, and with two mechanically actuated sealing-sleeves, one for each valve-port, in sealing position;

Fig. 9 is a fragmental view showing on an enlarged scale a portion of one sealing sleeve of the valve of Fig. 8, and adjacent parts, including some of the operating gearing; and Fig. 10 is a horizontal section on the line 10—10 of Fig. 8.

Figure 5:
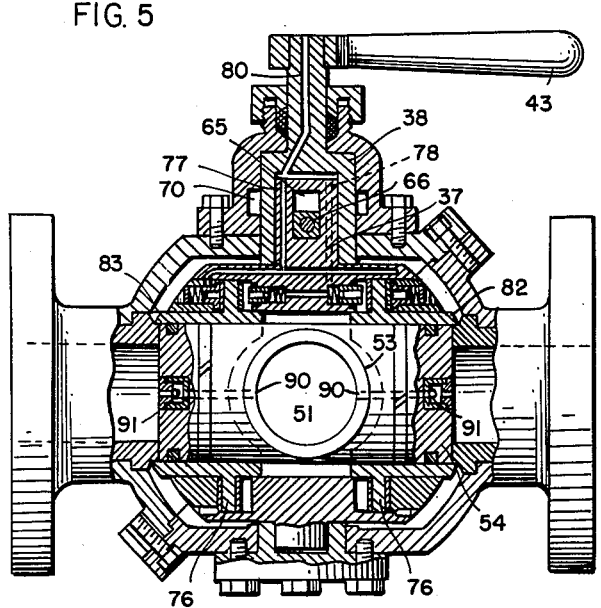
Fig. 5 is a longitudinal section through another modified valve embodying my invention, also with a spherical valve-plug in closed position, and with two hydraulically actuated sealing-sleeves, one for each valve port, in sealing position.

The valve of Figs. 1, 2, and 3 has a valve-casing 30, valve-cap 31, valve-plug 32, operating sleeve 38, and a manual manipulating handle 43, the valve-plug being of conical configuration. The valve-plug may be moved 90° about its axis between the closed position shown in Fig. 1 to an open position by a movement of the manual manipulating handle 43 and the operating sleeve 38; and the connection between the operating sleeve 38 and the valve-stem 37 is provided by mechanism including the locking cross-pin 66 co-operating with a longitudinal slot 65 in the valve-stem, with helical slots 69 in the operating sleeve 38, and with angle slots 70 in the valve cap. As a consequence, in the valve of Figs. 1, 2, and 3, the opening movement of the operating handle 43 is for 45° while the valve-plug remains stationary and the locking cross-pin 66 is moved upward in the longitudinal portions of the angle slots 70, and then for 90° in which it carries the valve-plug with it from open to closed position as the rollers 68 on the ends of the cross-pin 66 move in the circumferential portions of the angle slots 70; while in the closing movement of the valve the first 90° of movement of the operating handle 43 moves the valve-plug with it as the rollers 68 roll in the other direction in the circumferential portions of the angle slot 70, and the remaining 45° does not move the valve-plug but moves the cross-pin 66 downward in the longitudinal portions of those angle slots 70 as the valve-plug is held against further movement.

In the valve of Figs. 1, 2, and 3 there is a single sealing sleeve 75 mounted in and slidable transversely of the valve-plug. At one end the sealing sleeve 75 has a conical valve surface which by the sleeve movement while the valve-plug is at rest in closed position is moved into and out of sealing engagement with a mating valve surface around the valve seat 62 at the outlet port 34. This sealing sleeve 75 has an outwardly extending circumferential flange 76 (see especially Fig. 2), which co-operates with the ends of two passageways 77 and 78 provided in the valve-plug and its valve-stem 37 and opening through the upper end of that valve-stem. The passageway 77 has a simple opening at the upper end of the valve stem; but the passageway 78 terminates at that upper end of the valve stem in an arc-shaped groove 79 in the upper face of the valve stem, as is clear from Figs. 1 and 3. In the stem of the operating sleeve 38 there is a longitudinal passageway 80 having a radial lower end 80' forming a duct which overlies and connects with the upper end of the passageway 77 when the valve is fully closed, but overlies and connects with the arc-shaped groove 79 as soon as the operating sleeve 38 is moved relative to the valve-stem 37 away from fully closed position. Thus in fully closed position, shown in Figs. 1 and 2, the passageway 77 and the left side of the flange 76 are open to the atmosphere through the passageway 80; while when the operating sleeve 38 is moved out of that fully closed position the passageway 78 and the right side of the circumferential flange 76 are open to the atmosphere. A clearance space 81 around the outside of the sealing sleeve 75 admits fluid pressure to both sides of the circumferential flange 76, which fluid pressure comes from the line pressure existing inside the valve-casing.

Thus when the valve is in fully closed position, shown in Fig. 1, fluid pressure acts on the right side of the circumferential flange 76, because the passageway 78 is closed, while the passageway 77 and left side of the flange 76 are not under fluid pressure because that passageway is open to the atmosphere through the passageway 80. In consequence, in that situation with the valve closed, the unbalanced leftward pressure on the circumferential flange 76 forces the sealing sleeve 75 leftward to sealing position, with its valve surface in contact with the valve-surface around the outlet port 34. But when the operating handle 43 and operating sleeve 38 are moved out of fully closed position, and in consequence the passageway 78 is open to the atmosphere through the arc-groove 79 and the passageway 80, the unbalancing of pressure on the flange 76 is reversed; for then the right side of that circumferential flange is open to the atmosphere, while because of the closing of the passageway 77 the left side of the circumferential flange 76 is subjected to the fluid pressure of the line. Preferably the endwise movement of the sealing sleeve to left and right respectively carries the circumferential flange 76 into contact with the lower ends of the passageways 77 and 78 respectively; to close those passageways when they are open to the atmosphere, and thus to prevent continuous leakage of fluid through the passageway 80; to facilitate which closing the circumferential flange 76 desirably has each of its faces lined with a gasket 82 of yielding material.

In the operation of the valve of Figs. 1, 2, and 3, the sealing sleeve 75 is in sealing position when the valve is closed, as is shown in Fig. 1. When the operating handle is moved toward open position, it first moves the operating sleeve 38 without moving the valve-plug, under the control of the cross-pin 66 and its associated slots. In this movement the duct 80' is moved away from the upper end of the passage 77 and over the arc-shaped groove 79; and the fluid pressure thus admitted to the left side of the circumferential flange 76 while the pressure on the right side of that flange is released through the passageway 80, causes the sealing sleeve to move to the right, to unsealing position. Then, after the sealing sleeve has been so moved while the cross-pin 66 is being moved upward in the slot 65 in the valve-stem, the continued opening movement of the operating handle moves the valve-plug with the operating sleeve 38, to open the valve. The reverse takes place in the closing movement of the operating handle 43; for then in the first 90° of the movement of that handle the valve stem is turned with the operating sleeve 38 to move the valve-plug to closed position, after which the operating sleeve 38 continues while the valve-plug and valve-stem remain stationary, as the cross-pin 66 is moved downward in the slot 35. At about the end of the closing movement of the operating handle, the lower end of the passageway 80 moves from a position over the arc-shaped slot 79, and into position over the upper end of the passageway 77. This opens the left side of the flange 76 to the atmosphere, while closing the right side thereof against access to the atmosphere, and the resultant unbalanced pressure forces the sealing sleeve leftward to its sealing position shown in Figs. 1 and 2.

Figure 4:
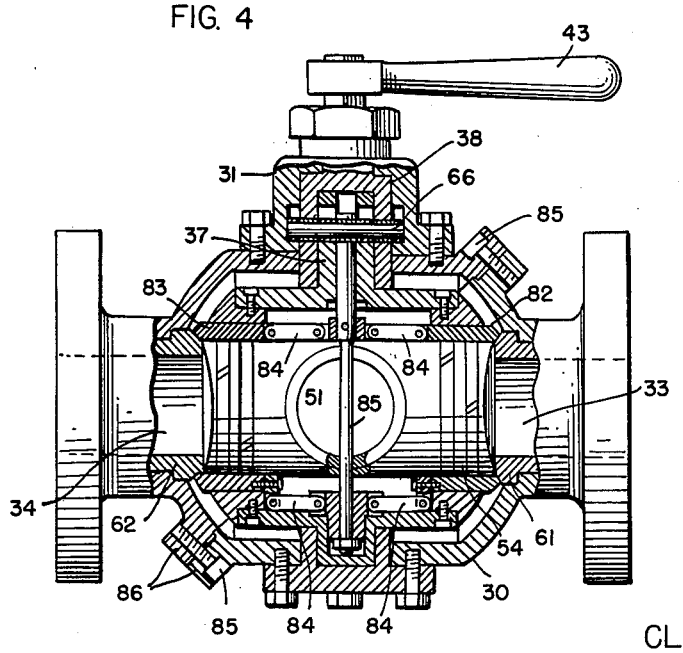
Fig. 4 is a longitudinal section through a modified valve embodying my invention, with a spherical valve-plug in closed position, and with two toggle-actuated sealing sleeves, one for each valve-port, in sealing position.

The modified valve of Fig. 4 has two mechanically separated sealing sleeves, one for each of the inlet and outlet ports. In addition, the valve of Fig. 4 is shown as a spherical valve; and for that reason its valve-casing 30 is made in two parts and with a removable trunnion-bearing at the bottom, to permit assembly and disassembly around the generally spherical valve-plug. The dividing line between the two parts of the casing is shown as an oblique dividing line, with the two parts held together by clamping screws 85, connecting lugs 86 on the two valve-casing parts.

The valve of Fig. 4 has a manual operating handle 43 which actuates the operating sleeve 38; which in turn is connected by a locking cross-pin 66 to the valve-stem 37 through helical slots in the operating sleeve and angle slots in the valve-cap 31, so that in and near closed position of the valve the movement of the operating handle turns the operating sleeve only, without turning the valve-stem 37 or the valve-plug, while in positions at and near the open position of the valve the valve-stem 37 is locked to the operating sleeve 38 to turn with it.

The vertical movement of the cross-pin 66 also operates the two sealing sleeves 82 and 83, which are slidable radially outward and inward together when the valve is in closed position into and out of sealing engagement with mating surfaces around the valve seats 61 and 62. Fig. 4 shows the parts in sealing position. The sealing sleeves 82 and 83 move outward together and inward together, and are connected by toggle links 84 to an axial rod 85 attached at its upper end to the cross-pin 66 so that it moves upward and downward with that cross-pin. When that cross-pin is down, the toggles are straightened, to push the two sealing sleeves outward into sealing position; whereas when the cross-pin 66 is raised the rod 85 is also raised to collapse the toggles and pull the two sealing sleeves 82 and 83 inward. Because it has two sealing sleeves, the valve of Fig. 4 is suitable for controlling flow of fluid in either direction.

Figure 6:
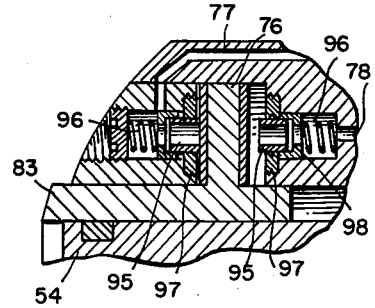
Fig. 6 is a fragmental view showing on an enlarged scale a portion of one sealing sleeve of the valve of Fig. 5, and adjacent parts, including auxiliary valves operated by the movement of that sealing sleeve.
Figure 7:
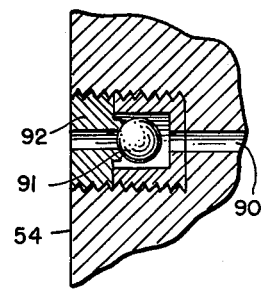
Fig. 7 is a detail of one of the check-valves in the valve-plug of Fig. 5.

The modified valve of Figs. 5, 6, and 7 has a spherical valve-plug and a split valve-casing, and two sealing sleeves for both valve-casing ports so that the valve is suitable for controlling fluid-flow in either direction, as in the valve of Fig. 4; but it differs from the latter valve in that the sealing sleeves are actuated hydraulically instead of mechanically. Each sealing sleeve is substantially a duplicate of the sealing sleeve of the valve of Fig. 1, with controlling passages and ports like those of Fig. 1 save that the passageways 77 and 78 lead in common to the outer and inner sides of flanges 76 on both sleeves. Thus under the action of the hydraulic pressure and the outlets to the atmosphere the two sealing valves move outward together and inward together.

To supply that hydraulic pressure from the line pressure, each of the projections 53 and 54 is provided with a passage 90 extending from the end of the projection into the main fluid passage 51; and each of the passageways 90 is provided with a check valve for admitting pressure from whichever casing port is under the higher pressure to the inside of the valve-casing, which in turn normally communicates with the spaces on both sides of both flanges 76. Such a check valve is shown in Fig. 7, and in the form there shown is a ball check valve, with a ball 91 acting against a sealing seat-member 92 screwed into an enlargement in the outer end of the passageway 90.

Preferably, as in the valve of Fig. 1, any passage to the atmosphere is closed by the movement of the flange 76 to either end of its stroke. The means for doing it in the valve of Fig. 5 is somewhat more elaborate than that shown in Fig. 1, and is shown in detail in Fig. 6. The flange 76, as in Fig. 4, desirably has a facing of gasket material on each side; but instead of co-operating simply with the open end of the passageway, it co-operates with a spring-pressed tubular plunger 95 yieldingly pressed toward the flange by a spring 96 in an enlargement at the end of the passageway. The movement of the tubular plunger 95 toward the flange 76 is limited by a screw plug 97 co-operating with a flange 98 on such tubular plunger. The screw plug 97 provides a ready means for adjusting the stroke and the sealing effect.

The valve shown in Figs. 8, 9, and 10, also like the valve of Fig. 4, has a spherical valve-plug, and an obliquely split casing; and has a general movement like the other forms of valve shown in that a sealing sleeve or sleeves are moved into and out of sealing position while the valve-plug proper remains at rest during the latter part of the valve-closing movement and the early part of the valve-opening movement respectively. The valve of Figs. 8, 9, and 10 also has two sealing sleeves 100, but instead of a simple radial sliding movement into and out of sealing position they are moved into and out of sealing position by helical movements; for which purpose they are mounted on the projections 53 and 54 by co-operating helical slots and grooves 101 (Figs. 8 and 9) so arranged that as the sleeves 100 are turned about their axes they advance or retreat radially. The turning movements of the sealing sleeves 100 about their axes obtain through helical pinions 102 meshing with helical gear teeth on the inner ends of the sleeves 100, as is clear from Fig. 8. The helical pinions 102 are at the outer ends of shafts 103 suitably mounted in the valve-plug structure as shown in Fig. 8, which shafts 103 at their inner ends are provided with beveled gears 104 meshing with a similar beveled gear 105 at the lower end of an axial shaft 106 extending upward through the valve stem 107. The shaft 106 is provided at its upper end with a worm gear 108 co-operating with a worm 109 carried in any suitable member and provided with an operating wheel 110. (Fig. 8.) The upper end of the valve stem 107 is square (or otherwise non-circular) externally, and longitudinally slidable upon it is the hub 111 of a cross-pin 112 in general corresponding to the cross-pin 66 of the valves already described. The cross-pin 112, like the cross-pin 66 already described, it provided with rollers 67 and 68, which co-operate with helical slots 69 and angle slots 70 similar to those already described but in this case provided in the valve-actuating member 38' carried by and depending from the worm gear 108 and with a stationary circular flange 113 rigid with the valve-casing.

The operation is substantially similar to that of the valves already described, under the control of the cross-pin 112 and its associated slots.

Preferably the adjacent ends of the two shafts 103, which are alined with each other, are pressed apart by a centering spring 115, as is clear from Fig. 8; and to permit that spring to act the two beveled gears 104 are splined on the respective shafts 103. The spring 115, and the helical nature of the gears 102, permits sufficient yielding to provide firm seating of both sealing sleeves against their valve seats.

I claim as my invention:

1. A rotary valve comprising a valve-casing having an inlet port and an outlet port, a valve-plug mounted in said valve-casing for rotation between open and closed positions in which it respectively interconnects and disconnects said two ports, a sealing sleeve transversely slidable on said valve-plug toward and from the valve-plug axis, said sealing sleeve and said valve-casing having around one of said ports co-operating sealing surfaces engageable when the valve-plug is in closed position, an operating member for said valve-plug, and fluid-operated sealing-sleeve-actuating means controlled by said operating member.

2. A rotary valve comprising a valve-casing having an inlet port and an outlet port, a valve-plug mounted in said valve-casing for rotation between open and closed positions in which it respectiely interconnects and disconnects said two ports, a sealing sleeve transversely slidable on said valve-plug toward and from the valve-plug axis, said sealing sleeve and said valve-casing having around one of said ports co-operating sealing surfaces engageable when the alve-plug is in closed position, an operating member for said valve-plug, said operating member and said valve-plug being formed for limited relative movement, and fluid-operated means controlled by such relative movement for moving said sealing sleeve.

3. A rotary valve comprising a valve-casing having an inlet port and an outlet port, a valve-plug mounted in said valve-casing for rotation between open and closed positions in which it respectively interconnects and disconnects said two ports, a sealing sleeve transversely slidable on said valve-plug toward and from the valve-plug axis, said sealing sleeve and said valve-casing having around one of said ports co-operating sealing surfaces engageable when the valve-plug is in closed position, an operating member for said valve-plug, said operating member and said valve-plug being formed for limited relative movement, and means operable by the fluid pressure within the valve-casing for moving said sealing sleeve.

4. A rotary valve comprising a valve-casing having an inlet port and an outlet port, a valve-plug mounted in said valve-casing for rotation between open and closed positions in which it respectively interconnects and disconnects said two ports, a sealing sleeve transversely slidable on said valve-plug toward and from the valve-plug axis, said sealing sleeve and said valve-casing having around one of said ports co-operating sealing surfaces engageable when the valve-plug is in closed position, an operating member for said valve-plug, said operating member and said valve-plug being formed for limited relative movement, and means operable by the fluid pressure within the valve-casing for moving said sealing sleeve.

5. A rotary valve comprising a valve-casing having an inlet port and an outlet port, a valve-plug mounted in said vale-casing for rotation between open and closed positions in which it respectively interconnects and disconnects said two ports, a sealing sleeve transversely slidable on said valve-plug toward and from the valve-plug axis, said sealing sleeve and said valve-casing having around one of said ports co-operating sealing surfaces engageable when the valve-plug is in closed position, an operating member for said valve-plug, said operating member and said valve-plug being formed for limited relative movement, and means controlled by said relative movement operable by the fluid pressure within the valve-casing for moving said sealing sleeve.

6. A rotary valve comprising a valve-casing having an inlet port and an outlet port, a valve-plug mounted in said vale-casing for rotation between open and closed positions in which it respectively interconnects and disconnects said two ports, a sealing sleeve transversely slidable on said valve-plug toward and from the valve-plug axis, said sealing sleeve and said valve-casing having around one of said ports co-operating sealing surfaces engageable when the valve-plug is in closed position, an operating member for said valve-plug, said operating member and said valve-plug being formed for limited relative movement, and means controlled by said relative movement operable by the fluid pressure within the valve-casing for moving said sealing sleeve.

7. A rotary valve comprising a valve casing having a communication chamber, inlet and outlet ports in said casing and connected with said chamber, a valve plug mounted in said chamber for rotation between open and closed positions and having an open-port conduit which connects said inlet and outlet ports when in open position, and a close-port portion which restricts fluid flow between said inlet and outlet ports when in closed position, a hollow member slidably mounted on and sealingly surrounding said close-port portion for engaging and sealing and disengaging and unsealing movements, with respect to the wall of said casing around one of said ports and radially of the axis of rotation of said plug, and fluid pressure driving means operable to shift the hollow member on the close-port portion of the valve plug for causing said movements.

8. A rotary valve comprising a valve casing having a communication chamber, inlet and outlet ports in said casing and connected with said chamber, a valve plug mounted in said chamber for rotation between open and closed positions and having an open-port conduit which connects said inlet and outlet ports when in open position, and a close-port portion which restricts fluid flow between said inlet and outlet ports when in closed position, a hollow member slidably mounted on and sealingly surrounding said close-port portion for engaging and sealing and disengaging and unsealing movements, with respect to the wall of said casing around one of said ports and radially of the axis of rotation of said plug, a manually operable handle drivingly connected with the valve plug to turn the same, and fluid pressure means operable to shift the hollow member on the close-port portion of the valve plug for causing said movements.

References Cited in the file of this patent

UNITED STATES PATENTS

| 1,705,487 | Marscheider | Mar. 19, 1929 |
| 2,265,176 | Kinzie | Dec. 9, 1941 |
| 2,443,995 | Snyder | June 22, 1948 |